US007987577B2

(12) United States Patent
Lenhardt

(10) Patent No.: US 7,987,577 B2
(45) Date of Patent: Aug. 2, 2011

(54) METHOD FOR PROVIDING AN OBLONG SHAPED PIECE AND FOR INSERTING SAID SHAPED PIECE INTO A HOLLOW SECTION BAR FROM WHICH A SPACER FOR INSULATED GLASS PANES IS FORMED

(76) Inventor: Karl Lenhardt, Bad Liebenzell (DE)

( * ) Notice: Subject to any disclaimer, the term of this patent is extended or adjusted under 35 U.S.C. 154(b) by 899 days.

(21) Appl. No.: 11/885,541

(22) PCT Filed: Mar. 3, 2006

(86) PCT No.: PCT/EP2006/001928
§ 371 (c)(1),
(2), (4) Date: Dec. 14, 2007

(87) PCT Pub. No.: WO2006/092314
PCT Pub. Date: Sep. 8, 2006

(65) Prior Publication Data
US 2008/0236096 A1 Oct. 2, 2008

(30) Foreign Application Priority Data
Mar. 4, 2005 (DE) ........................ 10 2005 011 362

(51) Int. Cl.
*B23P 11/02* (2006.01)

(52) U.S. Cl. ........................................................ 29/451

(58) Field of Classification Search .............. 29/42, 451, 29/453, 428; 52/786.13, 172, 658, 656.5, 52/656.9, 783.13, 717.02, 109; 403/395, 403/401; 16/388
See application file for complete search history.

(56) References Cited

U.S. PATENT DOCUMENTS 4,530,195 A * 7/1985 Leopold .................... 52/717.02
5,048,997 A 9/1991 Peterson
5,640,828 A 6/1997 Reeves

FOREIGN PATENT DOCUMENTS

DE 2938481 A1 8/1980
EP 0665357 A1 1/1995
GB 1381507 A 1/1975
GB 2001380 A 10/1981

* cited by examiner

*Primary Examiner* — John C Hong

(57) ABSTRACT

A method for providing a molded body and for inserting said molded body into a hollow bar section with a cross-section of a predetermined width and height that remains constant over its length, from which a frame-type spacer for insulating glass panes is subsequently configured, the molded body bridging a gap in said spacer. According to said method, a strand-type semi-finished product with a cross-section that remains constant over its length is provided; the semi-finished product is positioned in relation to a separation tool in such a way that a predefined section of the semi-finished product lies on one side and the remaining section of the semi-finished product lies on the other side of a separation plane of the separation tool and the length of the predefined section that is measured in the longitudinal direction of the semi-finished product is adapted to the inner width of the hollow bar section.

20 Claims, 4 Drawing Sheets

METHOD FOR PROVIDING AN OBLONG SHAPED PIECE AND FOR INSERTING SAID SHAPED PIECE INTO A HOLLOW SECTION BAR FROM WHICH A SPACER FOR INSULATED GLASS PANES IS FORMED

The present invention relates to a method for providing an oblong shaped piece and for inserting the shaped piece into a hollow section bar having a cross-section of predetermined width and height that remains constant over its length. The shaped piece is then used to form a frame-type spacer for insulating glass panes, the shaped piece bridging an opening in the spacer.

It has been known to bend spacers for insulating glass panes from a single hollow section bar. Following the bending operation, the two ends of the hollow section bar are positioned one opposite the other and have to be connected one with the other in order to close the frame-type spacer. It has been known for this purpose to use straight connectors with a cross-section that is suitably configured to permit the connectors to be fitted in the clear cross-section of the hollow section bar free from play. The known connectors are beveled at their ends for easier introduction into the hollow section bar. To prevent the connectors from being introduced into the one end of the hollow section bar a greater length than into the other end of the hollow section bar, a rib or some other projection is provided in the middle of the connector, which abuts against the edge of the hollow section bar thereby limiting the engaged length.

It has been known to produce such connectors as molded plastic parts by injection molding. It has likewise been known to produce such connectors from sheet metal by punching and bending. The connectors can be fitted in the ends of the hollow section bars manually. In production systems with a higher level of automation, the prefabricated connectors are fitted in the ends of the hollow section bars mechanically. In that case a tool is required that grips the connectors in a defined position for the fitting operation. It is necessary for this purpose that the connectors be supplied to the inserting tool separately and in defined orientation. It has been known to use vibratory bowl feeders for that purpose.

Insulating glass panes are produced with different spacing between the individual glass panels. In most of the cases, the spacing is in the range of between 6 mm and 30 mm. A typical production line for insulating glass panes produces insulating glass panes in varying formats and with varying spacing between their glass panels in irregular succession, depending on orders received. Correspondingly, spacers of different widths and, correspondingly, connectors of different widths are needed. Consequently, it is necessary that connectors of different widths be stocked near the production line for insulating glass panes and—in case of automated production of frame-type spacers—that a separate vibratory feed bowl be provided for each of the different connectors. This is expensive, especially as vibratory feed bowls require ample space, constitute an expensive investment and, on top of everything, are susceptible to faults.

Added to this, bent spacers may be constructed from more than one hollow section bars. Considering that hollow section bars usually are produced in fixed lengths of 5 m, for example, it makes sense in the case of insulating glass panes having a circumference of less than 5 meters to avoid waste by connecting the hollow section bars to endless bars using connectors. Such connection in series of hollow section bars is absolutely necessary in cases where a frame-type spacer is to be produced for an insulating glass pane that has a circumference longer than the length of a single hollow section bar.

It has also be known to form rectangular spacer frames from hollow section bars by initially cutting four hollow section bars to the length required for the four sides of the spacer frame, and then connecting the four sides one with the other by rectangular angle pieces that are inserted into the ends of two hollow section bars so as to join them at the corner of the spacer. Just as in the case of straight connectors, angle pieces of different widths are required in this case as well for insulating glass panes with varying spacing between the panes, namely four pieces for each spacer, and these must be supplied by different vibratory feed bowls—at least if they are to be fitted automatically.

Now, it is the object of the present invention to show how straight connectors and/or angle pieces for spacers in insulating glass panes can be supplied to and fitted in a hollow section bar at less expense.

That object is achieved by a method for providing a shaped piece and for inserting the shaped piece body into a hollow section bar having a cross-section of predetermined width and height that remains constant over its length, which bar is used to form a frame-type spacer for insulating glass panes, the shaped piece bridging an opening in the spacer, comprising the steps of

- providing an extrusion-like semi-finished product having a cross-section that remains constant over its length;
- positioning the semi-finished product relative to a separation tool so that a predefined section of the semi-finished product lies on one side and the remaining section of the semi-finished product lies on the other side of a separation plane of the separation tool and the length of the predefined section, measured in the longitudinal direction of the semi-finished product, is adapted to the clear width of the hollow section bar;
- seizing the predefined section of the semi-finished product by means of a mechanized gripper;
- forming the shaped piece by separating the predefined section, while it is held by the gripper, from the semi-finished product; and
- inserting the shaped piece, while it is still gripped, into the hollow section bar, the shaped piece being permanently gripped between its formation and its insertion.

Advantageous further developments of the invention are the subject-matter of the sub-claims.

According to the invention, an extrusion-like semi-finished product is provided the cross-section of which remains constant over its length. The semi-finished product is so positioned in relation to a separation tool that a predefined section of the semi-finished product lies on one side and the remaining section of the semi-finished product lies on the other side of the separation tool, and the length of the predefined section, measured in the longitudinal direction of the semi-finished product, is adapted to the inner width of the hollow section bar in which the shaped piece is to be fitted. A predefined section of the semi-finished product is seized by means of a mechanized gripper and is then separated from the extrusion-like semi-finished product. The shaped piece so separated is inserted into the hollow section bar using a gripper, without being released between those actions.

By employing that method, the invention teaches away from the previous way of producing frame-type spacers for insulating glass panes. The molded bodies, straight connectors or angle pieces, that are to be inserted into the hollow section bar, are no longer molded separately, supplied in containers, separated by vibratory bowl feeders, fed into the system, seized and fitted, but are now produced individually and in the order of succession in which they are needed for the spacers to be produced, on the site, in the factory of the manufacturer of the insulating glass panes, in proximity to the installations used at the manufacturers' facilities for producing the spacers, being formed by transverse separation from an extrusion-like semi-finished product having a cross-section that remains constant over its length. Connectors of different widths and equal height are formed according to the invention from one and the same extrusion-like semi-finished product of the particular desired width by transverse separation. Correspondingly, angle pieces of different widths, required for hollow section bars of different width but equal height, are produced in the required width from one and the same extrusion-like semi-finished product by transverse separation.

During that operation, the sections to be separated from the semi-finished product are first seized by a mechanized gripper, are then separated and finally inserted into the hollow section bar without the shaped piece—a straight connector or an angle piece—being released between those actions.

This way of proceeding offers substantial advantages:

The extrusion-like semi-finished product required for the method according to the invention can be produced at low cost, either by extrusion from metal, especially from aluminum or an aluminum alloy, or by extrusion from a plastic material. The use of an extrusion-like semi-finished product made from a plastic material is preferred because plastic materials are cheaper than aluminum and because 'their lower thermal conductivity, compared' with metals, permits the production of insulating glass panes with lower heat transfer coefficients compared with spacers made from metallic hollow section bars. Plastic materials having a strength suitable for the typical field service conditions of an insulating glass pane have been known to the man of the art. Suited for that purpose are, for example, polyamides, polyethylene, polypropylene, polystyrene, polycarbonate, polytetrafluoroethylene and ethylene-propylene-terpolymer (EPDM). These materials are likewise suited for extruding hollow section bars from plastic materials. In most of the cases, presently available hollow section bars for spacers consist, however, of aluminum or steel, especially stainless steel.

Hollow section bar can be transported and stocked at low cost and more economically with respect to space requirements than connectors and angle pieces that have been produced as separate moldings.

The extrusion-like semi-finished products may be procured from a supplier, or may be produced by the manufacturers of the insulating glass panes themselves.

Producing the connectors and angle pieces by cutting them off a prefabricated extrusion-like semi-finished product is very cost-saving especially because connectors and/or angle pieces of different widths can be produced from one and the same extrusion-like semi-finished product.

According to the invention, no installations will be needed and no expenses will be incurred for stocking straight connectors and angle pieces of different widths.

According to the invention, there is no need for vibratory bowl feeders or similar installations for cutting off and feeding straight connectors and angle pieces of different widths.

The molded bodies (straight connectors and angle pieces) remain under positive mechanical control from their production by separation from the semi-finished product to their insertion into the hollow section bar. All accidental, random movements that might make the operations of gripping and of inserting the connectors or angle pieces more difficult can be excluded according to the invention.

Another advantage results from the fact that the sequence of motions, from gripping of the section to be separated from the semi-finished product up to fitting of the cut-off connector or angle piece, can be greatly simplified. Repeatable equal motion sequences can be predefined even for connectors and angle pieces of different widths, whereby high working speeds and, consequently, short cycle times can be achieved in the production of frame-type spacers for insulating glass panes.

Preferably, the shaped piece separated from the semi-finished product is inserted into the hollow section bar using the same gripper by which it had been seized during separation from the semi-finished product. This is the simplest way of proceeding with respect to both equipment input and motion sequence. There is, however, also the possibility to have the shaped piece transferred by the very gripper that holds the shaped piece during separation from the semi-finished product to a second gripper by which it is then fitted in the hollow section bar. This way of proceeding would permit shorter cycle times because the operations of separating and of fitting the shaped piece in a hollow section bar could then take place at the same time.

As regards the concrete shape of the shaped piece, there are numerous possibilities. It must be ensured, however, that the molded bodies are inserted into the predefined hollow section bars free from play or substantially free from play and are held therein undetachably, preferably by a friction fit. This can be achieved by the use of suitably sized rigid molded bodies, but also by the use of molded bodies which, in addition to sufficient rigidity and dimensional stability, also have some degree of compliance that produces a restoring force, for example in the form of resilient strips that are subjected to bending stress as the shaped piece is introduced into the hollow section bar, thereby producing a friction fit in the hollow section bar. Conveniently, the molded bodies will be oblong or, depending on the case, angled structures.

Due to their production by transverse separation from an extrusion-like semi-finished product, having a cross-section that remains constant over its length, the longitudinal cross-section of the shaped piece, produced by transverse separation from the semi-finished product, conforms with the cross-section of the extrusion-like semi-finished product.

Preferably, in carrying out the method according to the invention, the separation tool and the hollow section bar into which the shaped piece to be separated is to be inserted, are arranged in firm spatial relation one to the other, which relation is selected to remain constant during each separation process and during the subsequent inserting operation. Further, it is of advantage if the separation tool is arranged to have a constant separation plane.

Further it is of advantage if the method is carried out in such a way that the hollow section bar is positioned in parallel to the separation plane of the separation tool, especially in parallel to the predefined section of the semi-finished product that is to be separated, and if the gripper performs a translational movement only for inserting the shaped piece into the hollow section bar. All these before-mentioned four measures are intended to simplify the sequence of motions necessary for transferring the molded bodies from the separation tool into the hollow section bar, the firm spatial relation constituting fixed points or fixed reference points or reference lines for the movement of the gripper that simplify control of the gripper, help avoid faulty positioning and assist in speeding up the process.

If the shaped piece is a straight connector that is to be inserted into one end of the hollow section bar, then the separation tool and the end of the hollow section bar into which the shaped piece is to be inserted first will be arranged in firm special relation one to the other.

If the shaped piece is an angle piece intended to connect two hollow section bars at an angle, then the separation tool and at least one of the two hollow section bars, preferably both hollow section bars into which the angle piece is to be inserted, are arranged so that their ends assume a fixed special relation one relative to the other.

Alternatively, the shaped piece may be a two-leg structure, which can be folded from a straight condition to an angle piece for connecting two hollow section bars one with the other at an angle. Foldable angle pieces have been known from prior use in the USA, but are prefabricated in that case individually as separate moldings. In cases where a shaped piece is to be processed that can be folded to form an angle piece then, preferably, the separation tool and one of the ends of at least one of the two hollow section bars are positioned in fixed spatial relation one to the other.

According to another advantageous further development of the invention, for producing a spacer with bent corners one provides the hollow section bar in the areas where a corner is to be formed with a cutout that extends over the corner without however completely separating the hollow section bar, one then introduces a shaped piece, which is configured as a two-leg structure and which can be folded to an angle piece from a straight condition, through the cutout and into the hollow section bar, while the latter is still in its straight condition, whereafter the corner of the spacer is formed by bending the hollow section bar together with the shaped piece contained in it. While the shaped piece is not required in that case to secure the safe connection of the corner, it should secure the predefined angle the spacer is to show at the corner. Such two-leg structures that can be folded to an angle piece, and spacers with continuous outer wall formed from them, have been disclosed by German Patent Application DE 10 2005 037 303 A1, priority date: 18 Jan. 2005, to which express reference is herewith made with respect to further details.

Such two-leg structures that can be folded to form an angle piece can likewise be produced and processed at extremely low cost according to the invention.

For inserting such a foldable shaped piece into a hollow section bar, provided with a cutout for purposes of forming a bent corner, the method preferably is carried out in such a way that the separation tool and the respective cutout in the hollow section bar, into which the foldable shaped piece is to be inserted, is positioned in fixed spatial relation one to the other.

For forming such a spacer with bent corners, which are stabilized by a foldable angle piece, the hollow section bar preferably is provided with an outer wall that forms the outside of the spacer and that remains intact when the cutout is made. Instead, the cutout should extend, in the area where the corner is to be formed, from the two flanks of the hollow section bar that later will face the glass panels of the insulating glass pane, starting from the inner wall of the hollow section bar opposite its outer wall, in the direction of the outer wall without, however, separating the latter. Further, in the area where the corner is to be formed the cutout should extend on that side of the spacer which later is to form its inner surface, on both sides of the point at which the corner is to be formed and over a total length smaller than the length of the foldable shaped piece, so that the latter will be captivated undetachably once it has been fitted in the hollow section bar.

Preferably, the semi-finished product is cut between cutting edges of the separation tool that are arranged for being moved in opposite directions. This provides the advantage that the tendency of the semi-finished product to get displaced during the cutting operation is kept small which in turn facilitates the gripping action of the gripper. The two cutting edges may consist of cutters arranged for being moved toward each other. However, there is also the possibility to cut, especially to saw, the semi-finished product using a rotating cutting tool which may be a practical solution especially for metallic semi-finished products and for angled semi-finished products.

Certain embodiments of the invention are illustrated in the attached drawings. Identical parts, or parts corresponding one to the other, are indicated by the same reference numerals in the different examples.

Further advantages of the invention will become apparent from the description of the drawings in which.

Figure 1:
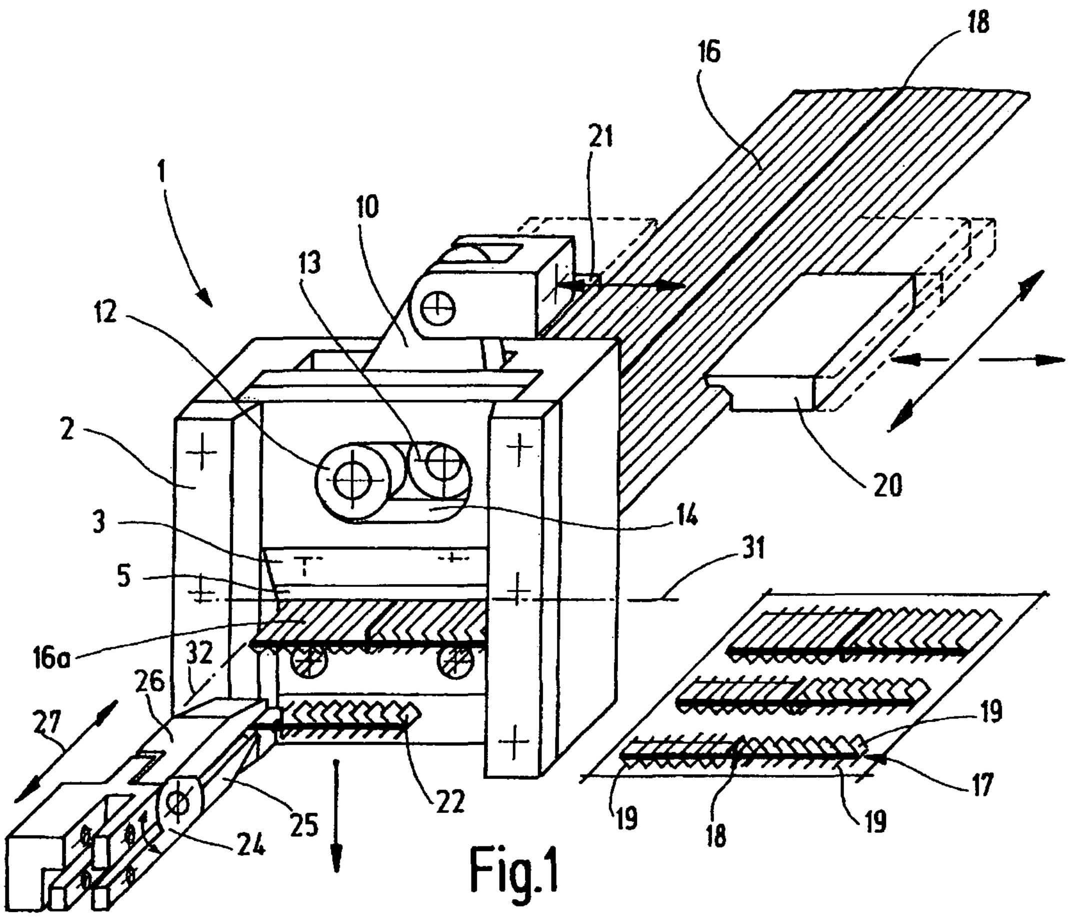
FIG. 1 shows an oblique view of a separation tool to which an extrusion-like semi-finished product is being fed, and a gripper for handling a straight connector that has been separated from the semi-finished product.
Figure 2:
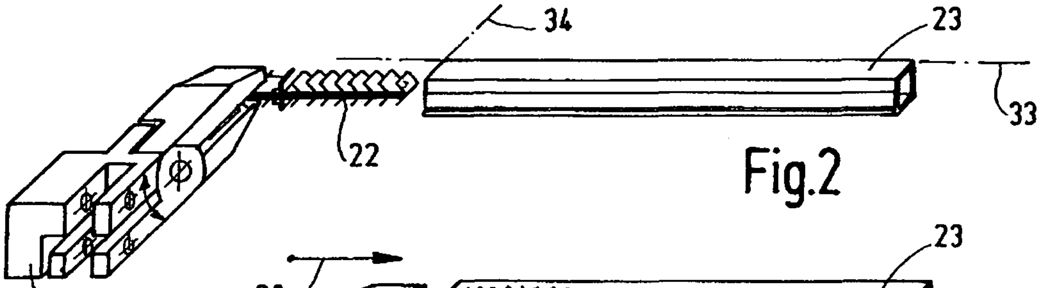
FIG. 2 shows an oblique view of a hollow section bar to which the connector is supplied.
Figure 3:
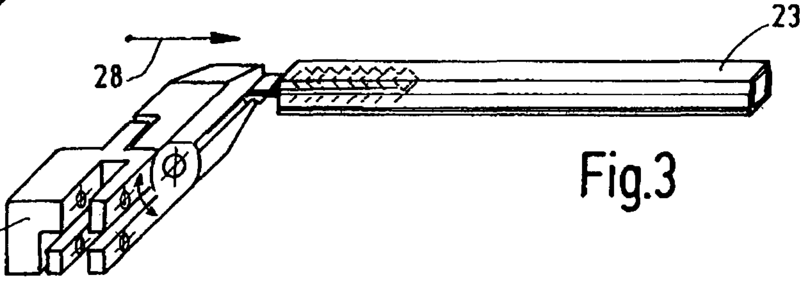
FIG. 3 shows an oblique view of the hollow section bar illustrated in FIG. 2, with the connector in fitted condition.

FIG. 1 shows a separation tool 1 with a frame 2 in which two mutually parallel cutter holders 3 and 4 are guided in parallel one to the other for displacement in opposite directions. The structure of the separation tool 1 is illustrated in detail in FIGS. 5 to 8. The first cutter holder 3 carries a first cutter 5. The second cutter holder 4 carries a second cutter 6. During the separating operation, the two cutting edges 7 of the cutters slide one past the other thereby defining a separation plane 8.

An eccentric lever 10 that can be swung to and fro by a cylinder 11 is mounted on a shaft 9 seated in the frame 2 and extending perpendicularly to the separation plane 8. Two rollers 12 and 13 are mounted on the eccentric lever 10. The rollers 12 and 13 are seated to freely rotate about axes extending in parallel to the shaft 9, and eccentrically relative to the axis of the shaft 9. The first roller 12 is arranged in a cutout 14 in the first cutter holder 3. The second roller 13 is arranged in a cutout 15 in the second cutter holder 4. The two cutouts 14 and 15 take the form of oblong holes adapted to the diameter of the rollers 12 and 13 and serve as guides for the rollers 12 and 13. When the fluid cylinder 11 is actuated, the rollers 12 and 13 move up and down in opposite directions, due to their eccentric seating arrangement, thereby causing the cutters 5 and 6 to move in opposite directions between the position illustrated in FIG. 7, where the cutters 5 and 6 are open, and the position illustrated in FIG. 8, where the cutters 5 and 6 are closed and the separating operation has been completed.

An extrusion-like semi-finished product is fed to the separation tool 1, in a direction perpendicular to the separation plane 8, the semi-finished product consisting in the example of FIG. 1 of an extruded plastic profile that consists of a plate 17 on which a series of lamellas 19 are arranged on both sides of a centrally arranged web 18 that crosses the plate 17 at a right angle, the lamellas extending obliquely relative to the plate 17 so that their free ends extend obliquely to the web 18.

Using a pair of tongs comprising two jaws 20, 21, the spacing of which can be varied and which can be moved to and fro at a right angle relative to the separation plane 8, the semi-finished product 16 can be displaced by steps for being fed to the separation tool 1. The separation tool 1 is in a position to cut off from the semi-finished product 16 shaped pieces 22 of different widths, three examples of which are shown in FIG. 1. The semi-finished product 16 is displaced by means of the jaws 20 and 21 until a section **16*a* corresponding to the desired width of the shaped piece 22 projects beyond the separation plane 8—see FIG. 1**.

In the embodiment illustrated in FIGS. 1 to 4, the shaped piece 22 is a straight connector for hollow section bars 23. A gripper 24, comprising two jaws 25 and 26, is provided for transferring such a connector 22. Means for actuating the gripper 24 are not shown in the drawing, being known as such to the man of the art. The gripper 24 can be displaced in the first line in a direction perpendicular to the separation plane 8. That direction is indicated by an arrow 27. In addition, the gripper 24 can be displaced in a direction parallel to the separation plane 8 and in parallel to the plate 11 of the semi-finished product 16, which direction is indicated by an arrow 28. These two directions of movement are sufficient for transferring the connector 22 from the separation tool 1 into a hollow section bar 23, once the hollow section bar occupies a reference position adapted to the separation tool 1 in which the hollow section bar 23 extends in parallel to the separation plane 8 and in parallel to the cutting edges 7 of the cutters 5 and 6, and at the level of the semi-finished product 16.

The gripper 24 seizes the section **16*a* of the semi-finished product 16, that projects beyond the separation plane 8, already before such section is cut off. During the cutting operation, the section 16*a* is held by the gripper 24. This is possible without any problem because the cutters 5 and 6 move in opposite directions and perpendicularly to the plate 17 of the semi-finished product 16 so that the cutting operation produces practically no tendency of the section 16*a* to get displaced. Once the section 16*a* has been cut off and the connector 22 has been formed, the gripper 24 moves the connector away from the separation tool 1 in the direction indicated by arrow 27 until it is in alignment with the hollow section bar 23—see FIG. 2. The gripper 24 then moves in the direction indicated by arrow 28—see FIG. 3—to insert the connector 22 into the hollow section bar 23 until the web 18 comes to abut against the edge of the hollow section bar 23. The hollow section bar 23** is fixed in its predefined position, for example clamped or positioned against a stop, for that purpose.

During that inserting operation the tongs with the jaws 20 and 21 already advance the semi-finished product 16 a certain length in preparation of a separating cut for production of the next shaped piece 22. The gripper 24 opens and moves back to the separation tool 1, against the direction indicated by arrows 28 and 27, for gripping the next section **16*a* of the semi-finished product that meanwhile has been positioned for that purpose. During that operation, the end of a further hollow section bar 23*a* can be fitted on the portion of the connector 22 that projects from the hollow section bar 23, as illustrated in FIG. 4**.

It is an advantage that the connector 22 always occupies a defined position and that it is never left to itself. This permits the method to be carried out at high speed and with high precision. Irrespective of the width of the connector 22, the gripper 24 always moves along the same paths. In spite of the use of connectors 22 of different widths it can orient its movements taking a bearing on unchanging reference lines: Suited as a first reference line 31 is the center line between the two cutting edges 7 and 8. The second reference line 32 may, for example, consist of a longitudinal edge of the semi-finished product 16 that has been forcedly positioned and advanced, for example the left edge of the semi-finished product 16 shown in FIG. 1 to which the left edge of the jaws 25 and 26 of the gripper 24 may be aligned, or else the web 18. A third reference line 33 determines the position in height of the hollow section bar 23, and a fourth reference line 34 determines the position of the end of the hollow section bar 23 into which the connector 22 is to be introduced.

The operating sequence illustrated in FIGS. 1 to 4 is not necessarily prescribed. It is possible, for example, to select a different position in height (reference line 33) for the hollow section bar 23. The gripper 24 must then additionally be in a position to perform a movement in a direction perpendicular to arrow 27 and perpendicular to arrow 28. There is further the possibility to have the gripper 24 perform only a reciprocating movement in the direction of arrow 27 and to carry out the fitting operation by displacing the hollow section bar 23 relative to the gripper 24.

Figure 4:
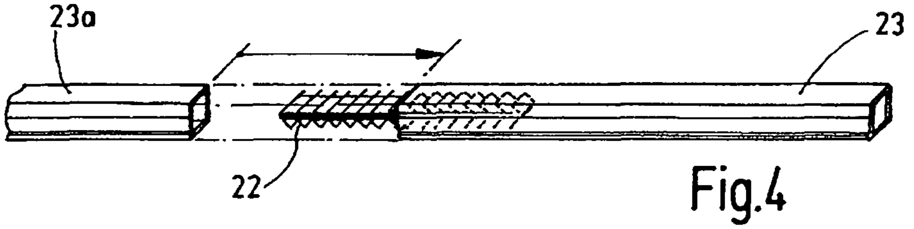
FIG. 4 shows the hollow section bar from FIG. 3 prior to being connected with a second hollow section bar.
Figure 5:
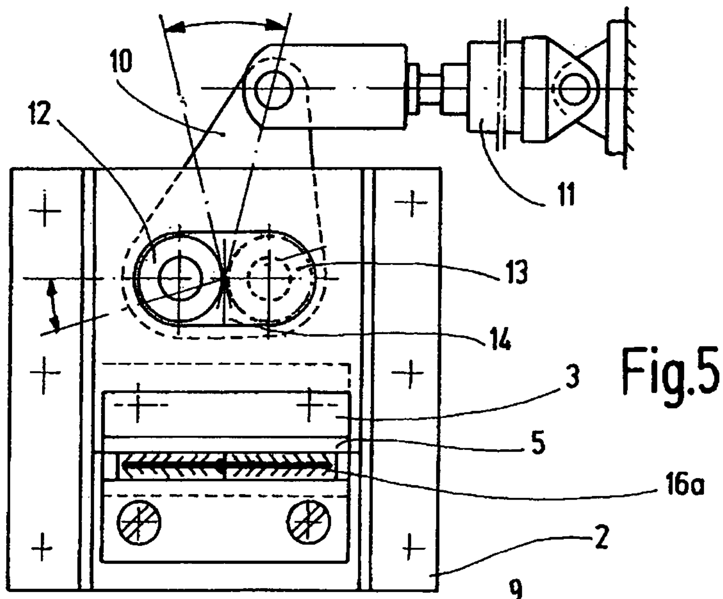
FIG. 5 shows a front view of the separation tool from FIG. 1.
Figure 6:
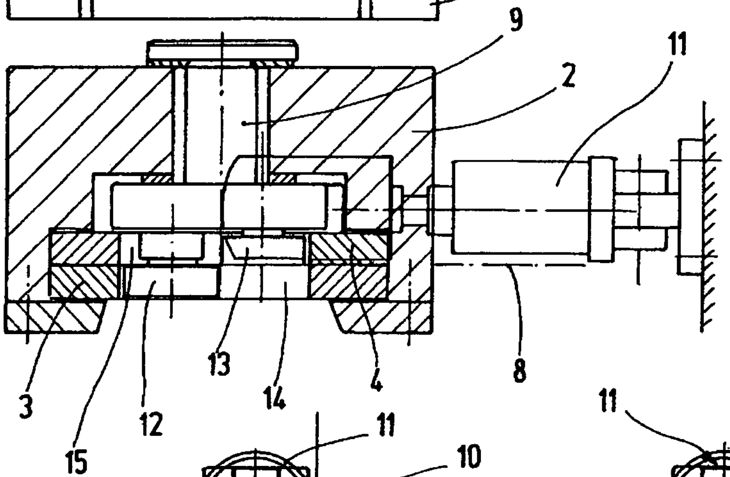
FIG. 6 shows a top view of the separation tool from FIG. 5.
Figure 7:
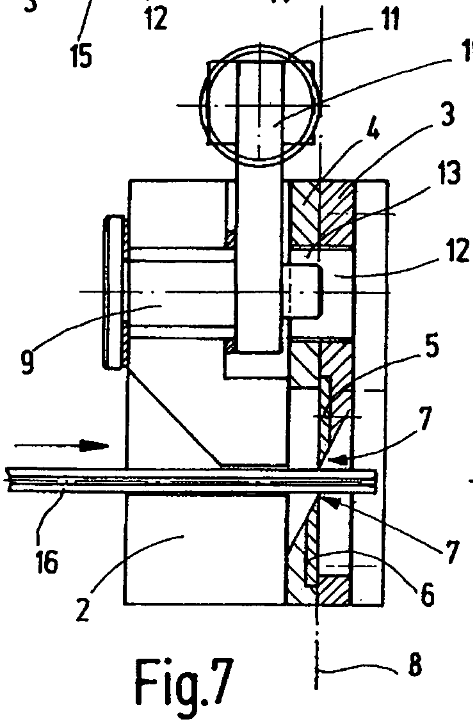
FIG. 7 shows a vertical section of the separation tool along line A-A, in the position it occupies prior to the separating operation.
Figure 8:
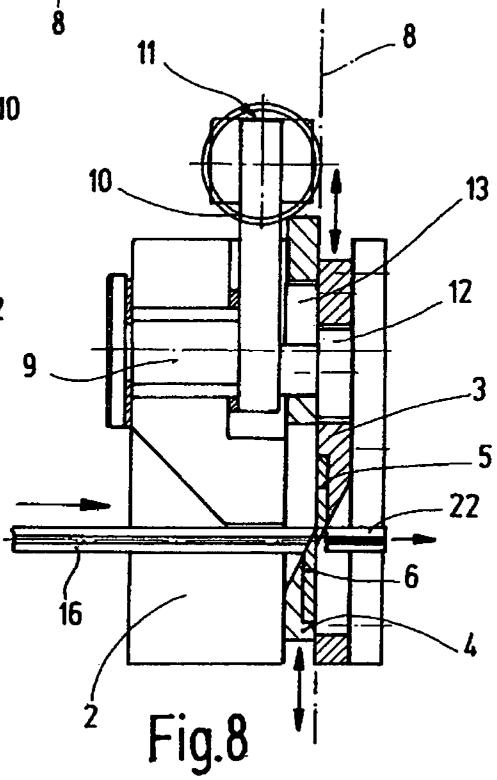
FIG. 8 shows a vertical section of the separation tool similar to that of FIG. 7, but after the separating operation.

Depending on the particular application, it is of course also possible to fit on the connector 22—while it is still projecting from the hollow section bar 23 in FIG. 4—not only the end of a further hollow section bar **23*a*, but also the other end of the hollow section bar 23** in case where a frame is to be formed from the latter by bending.

The embodiment illustrated in FIGS. 9 to 15 differs from that shown in FIGS. 1 to 8 in that the semi-finished product 16 has a different cross-sectional shape, in that the separation tool 1, instead of using two cutters that can be displaced one relative to the other, uses a rotating cutting-off wheel 35 that may especially be configured as a saw blade. For collecting the chips that may be produced during the separating operation, a collecting device 36 is arranged underneath the cutting-off wheel 35, with the cutting-off wheel 35 dipping in part into that arrangement. Any supporting and guide means for the semi-finished product that may be provided between the tongs with the jaws 20 and 21 on the one side and the separation tool 1 on the other side have been omitted in FIG. 9 as well as in FIG. 1 for reasons of clarity.

The structure of the gripper 24 is similar to that illustrated in FIG. 1, although it is additionally pivotable about an axis 37 that extends perpendicularly to the cutting-off wheel 35 and, accordingly, perpendicularly to the separation plane 8.

Regarding the cross-section, the extrusion-like semi-finished product 16 has two legs 38 and 39 of equal length that are connected by a foil joint 40. The two legs 38 and 39 have flexible strips 41 on their one side, which project a little beyond the foil joint 40. The side of the legs 38 and 39 opposite the strips 41—except for an inclined lead-in portion 42 at the tips of the legs 14, 15—has a plane configuration and extends in parallel to the outside of the foil joint 40 in the straight condition of the legs.

On the side of the legs 38 and 39 opposite the foil joint 40 there is provided a stop 43 and 44, respectively, which is formed by increasing the height of the legs 38 and 39 by steps, in the neighborhood of the foil joint 40, by approximately the thickness of the wall of the hollow section bar 23.

The leg 39 has a cutout 45 in the neighborhood of the foil joint 40 which is open on its side facing the opposite leg 38. The leg 38 is provided with a hook 46 in the neighborhood of the foil joint 40 that points in the direction of the tip of the leg 38. A cutout 45 in the other leg 39 is arranged opposite the hook 46. The hook 46 is so configured and arranged that it snaps into the oppositely arranged cutout 45 when the two legs 38 and 39 swing about the foil joint 40. The form-locking engagement of the hook 46 in the cutout 45 locks the two legs 38 and 39 in their position while enclosing between them a right angle.

Figures 9, 10, 11, 12, 13, 14, 15:
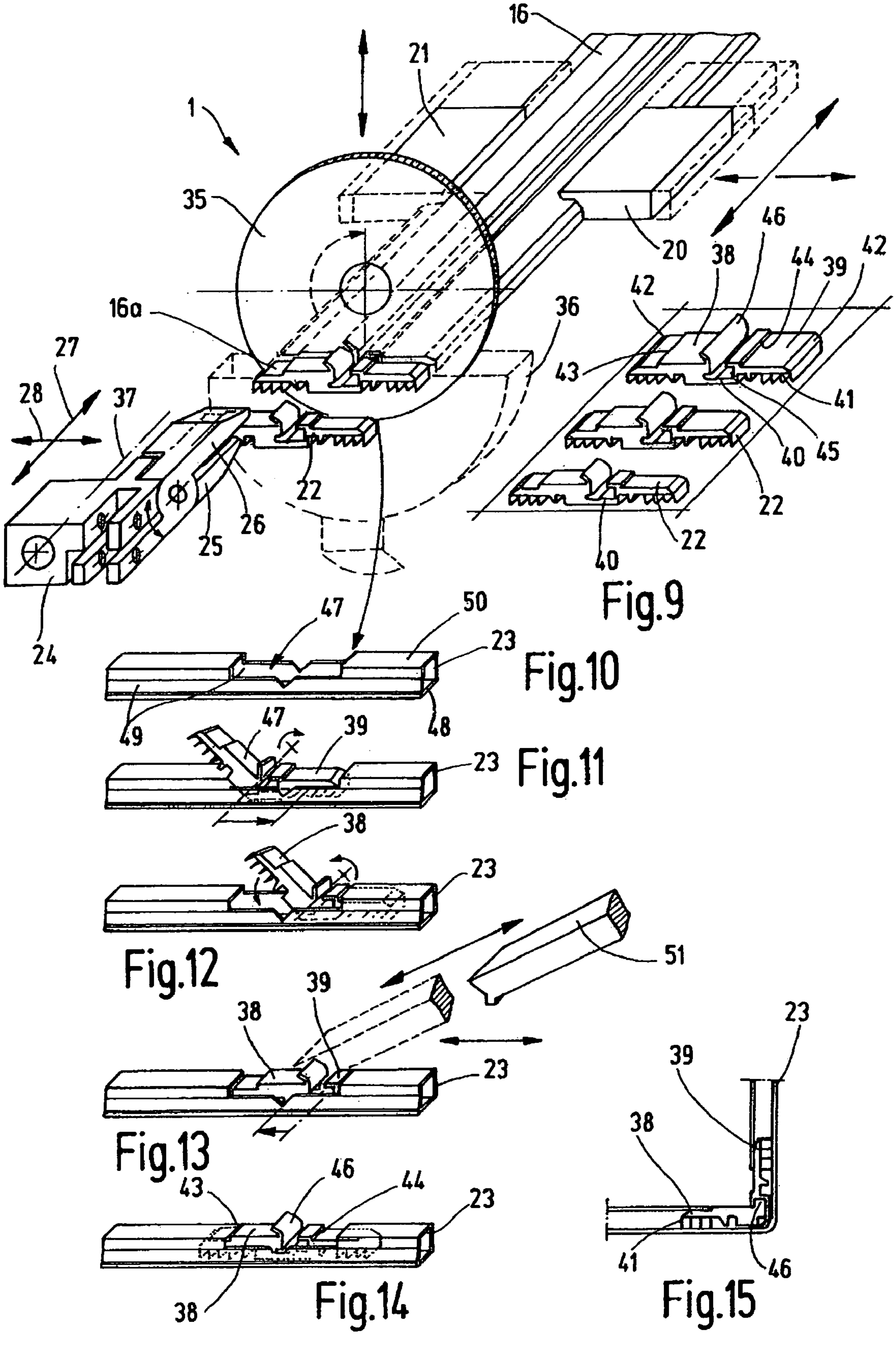
FIG. 9 shows an oblique view of a first modification of the method according to the invention, with a modified separation tool and a modified semi-finished product for producing molded bodies that can be folded to form an angle piece.
FIG. 10 shows an oblique view of a hollow section bar with a cutout intended for receiving such a foldable shaped piece.
FIGS. 11 to 14 show successive phases of the operation of fitting such a shaped piece in a hollow section bar.
FIG. 15 shows a longitudinal cross-section through the area of a corner, after bending or folding of the hollow section bar, and of the shaped piece fitted in that area.

Just as described for the first embodiment, shaped pieces 22 of different widths are cut off from the semi-finished product 16 as required and are securely held by the gripper 24 during the cutting operation. Now, these shaped pieces 22 are not intended to be fitted in the end of a hollow section bar 23, but serve to be introduced into a cutout 47 in the hollow section bar 23, as illustrated in FIG. 10. The hollow section bar 23 has an outer wall 48, two flanks 49 and an inner wall 50 parallel to the outer wall 48. At a location where a corner is to be formed, the hollow section bar 23 is provided with a cutout 47 that extends from the inner wall 50 into the flanks 49. Two portions of the cutout 47, located in the flanks 49 in congruent opposite arrangement one to the other, have the form of a rectangular miter cut the point of which is located at the level of the inside of the outer wall 48 for determining the position of a bending axis about which the corner is to be bent. On both sides of the miter cut in the flanks 49, the inner wall 50 has been removed over a predefined length and over the full width, the length being distributed evenly between the two sides of the miter cut.

In order to introduce the shaped piece 22, being held by the gripper 24, into the cutout 47 the gripper 24 is initially moved away from the cutting-off disk 35 in the direction of arrow 27 until the shaped piece 22 occupies a position exactly above the cutout 47 of the hollow section bar 23 that has been positioned in a predefined reference position. The gripper 24 is then swung about its axis 37, whereby the leg 39 dips into the cutout 47 until it assumes a flat position in the cutout, as illustrated in FIG. 11. If necessary, the gripper 24 may also be approached to the hollow section bar 23 for this purpose, vertically to the direction indicated by arrows 27 and 28.

For reasons of clarity, the gripper is not shown in FIG. 11. Starting from the position illustrated in FIG. 11, the gripper is moved in the direction of arrow 28, whereby the shaped piece 22 is pushed into the hollow section bar 23 until it hits upon the edge of the cutout 47, as illustrated in FIG. 12. The gripper 24 then releases the leg 38 of the shaped piece 22 whereupon the latter swings automatically into the cutout 47, under the action of the restoring force produced by the foil joint 40, so as to assume the position illustrated in FIG. 13. In case the restoring force of the foil joint 40 should not be sufficient, there is still the possibility to have a push rod—not shown—act upon the leg 38 for pushing it into the cutout 47.

Now, the shaped piece 22 is centered by displacing it in the cutout 47 by means of a push rod 51 that acts obliquely from above. This is the purpose for which the stop 43 has been provided: When the stop abuts against the edge of the cutout 47, then the shaped piece 22 is in its centered position, as illustrated in FIG. 14. In that position, the ends of both legs 38 and 39 lie below the inner wall 50 so that the shaped piece 22 is captivated undetachably. The hollow section bar 23 can now be transferred to a different working position where it is bent to a corner at the point where the miter cuts of the cutout 47 are located, whereby the shaped piece 22 is folded. In the 90° position the two legs 38 and 39 of the shaped piece 22 are automatically locked one relative to the other thereby stabilizing the corner which advantageously has a continuous outer wall 48.

The third embodiment illustrated in FIGS. 16 to 22 differs from the second embodiment illustrated in FIGS. 9 to 15 in that the gripper, instead of being provided with two jaws, has three jaws 52, 53 and 54 which are configured as cylindrical rods or fingers in the present case. The three jaws 52, 53, 54 are so arranged one parallel to the other that a central jaw 52 can be moved vertically in relation to a plane formed between the two outer jaws 53 and 54, i.e. between a first position in which the central jaw 52 lies below that plane and a second position in which the central jaw 52 lies above that plane formed between the two outer jaws 53, 54.

The main body of the gripper, carrying the jaws 52, 53 and 54 as well as their actuating means, has not been shown in the drawing for reasons of clarity.

Figure 21:
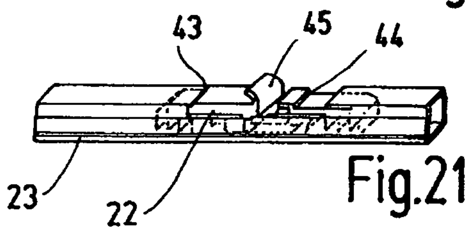
Figure 20:
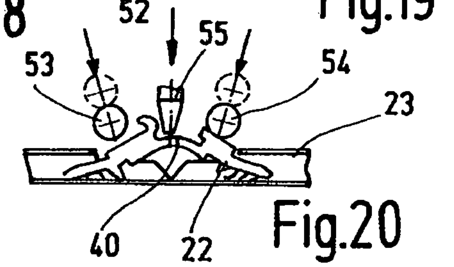
Figure 22:
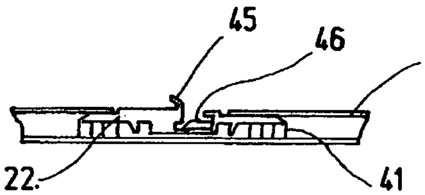

The section 16*a* to be cut off the semi-finished product 16 is initially gripped by the jaws 52 to 54 in such a way that the two outer jaws 53 and 54 engage the upside of the legs 38 and 39 while the central jaw 52 engages the foil joint 40 from below. Once the shaped piece 22 has been cut off, the gripper initially moves in vertical direction relative to, and away from, the cutting-off disk 35, in the direction indicated by arrow 27 until the shaped piece 22 occupies a position immediately above the cutout 47 of a hollow section bar 23 located in a predefined reference position, that reference position being selected to ensure that the central jaw 52 comes to lie vertically above the miter cuts of the cutout 47—see FIG. 17. The shaped piece 22 is now bent about the central jaw 52, in the area of the foil joint 40, by lifting the central jaw 52 relative to the outer jaws 53 and 54, or by lowering the outer jaws 53 and 54 relative to the central jaw 52—see FIG. 17. Thereafter, the gripper is moved down in the direction indicated by arrow 30, perpendicularly to the direction indicated by arrow 27, so that the ends of the legs 38 and 39 dip into the cutout 47, as illustrated by the hollow section bar 23 in the oblique view of FIG. 18 and in the longitudinal cross-section of FIG. 19. A push rod 55 is now approached from above and is positioned on the foil joint 40. The jaws 52, 53 and 54 then release the shaped piece 22, and the push rod 55 pushes the shaped piece 22 fully into the cutout 47 until the foil joint 40 gets into contact with the hollow section bar 23 and the shaped piece 22 has assumed its straight condition in which it is captivated undetachably in the hollow section bar 23—as illustrated in FIGS. 20 to 22. The hollow section bar 23 can now be bent, whereby the shaped piece 22 is bent to the form of an angle piece that stabilizes the corner—as illustrated in FIG. 15.

Figure 16:
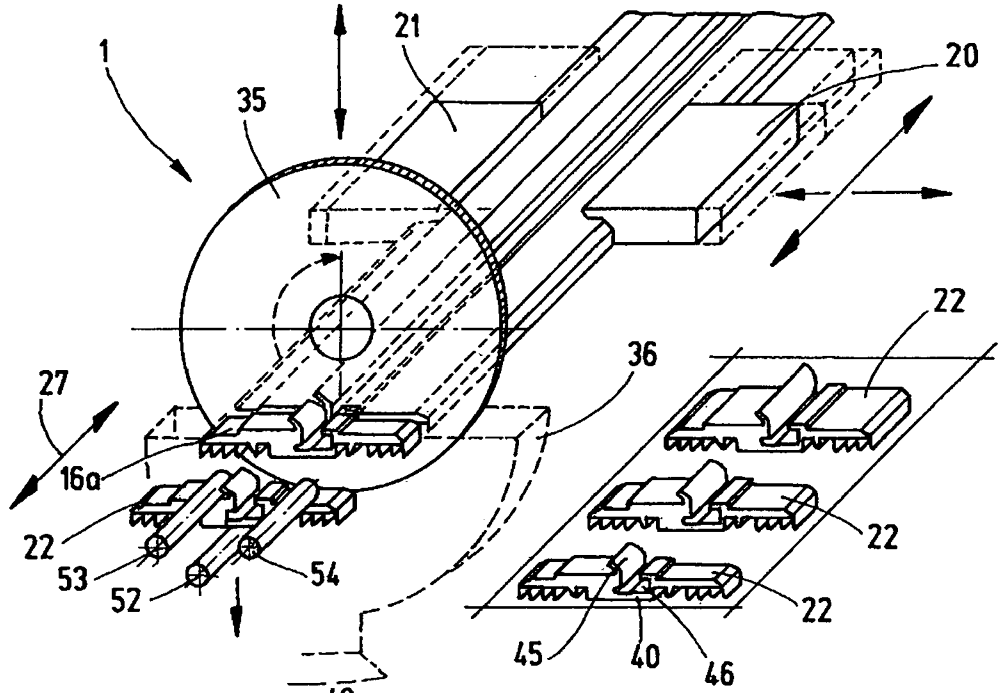
FIG. 16 shows a second modification of the method according to the invention, with a separation tool, an extrusion-like semi-finished product similar to that shown in FIG. 9, and with fingers of a modified gripper.
Figure 17:
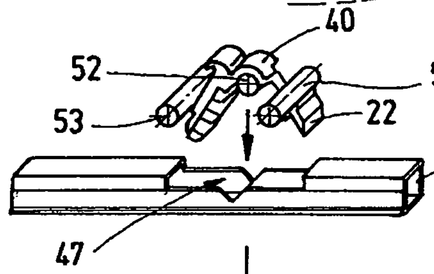
FIGS. 17 to 22 show successive phases of the operations of transferring the foldable shaped piece, and of fitting it in a hollow section bar.
Figure 18:
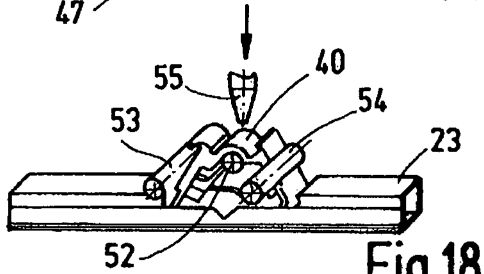
Figure 19:
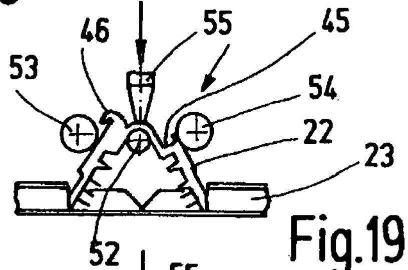

A cutting-off disk 35, as illustrated in FIGS. 9 and 16, can be used also for cutting off an angled semi-finished product from which rigid angle pieces can be obtained that can then be used for combining separate hollow section bars to a rectangular frame. The operations of transverse cutting, transferring and fitting such an angle piece, aimed at introducing one of its two legs into one end of a hollow section bar, are carried out in a way analogous to the description of the first embodiment.

The invention claimed is:

1. Method for providing a shaped piece and for inserting the shaped piece into a hollow section bar having a cross-section of predetermined width and height that remains constant over its length, which bar is then used to form a frame-type spacer for insulating glass panes, the shaped piece bridging an opening in the spacer, comprising the steps of providing an extrusion-like semi-finished product having a cross-section that remains constant over its length;

positioning the semi-finished product relative to a separation tool so that a predefined section of the semi-finished product lies on one side and the remaining section of the semi-finished product lies on the other side of a separation plane of the separation tool and the length of the predefined section, measured in the longitudinal direction of the semi-finished product, is adapted to a clear width of the hollow section bar;

seizing the predefined section of the semi-finished product by means of a mechanized gripper;

forming the shaped piece by separating the predefined section, while it is held by the gripper, from the semi-finished product; and inserting the shaped piece, while it is still gripped, into the hollow section bar, the shaped piece being permanently gripped between its formation and its insertion.

2. The method as defined in claim 1, wherein the shaped piece is inserted into the hollow section bar using the same gripper by which it is seized during separation from the semi-finished product.

3. The method as defined in claim 1, wherein the shaped piece is transferred by the gripper that holds the shaped piece during separation from the semi-finished product to a second gripper by which it is then fitted in the hollow section bar.

4. The method as defined in claim 1, wherein the shaped piece has a predefined oblong shape and a longitudinal section that fits into the cross-section of the semi-finished product.

5. The method as defined in claim 1, wherein the semi-finished product is made from aluminum or an aluminum alloy, by extruding.

6. The method as defined in claim 1, wherein the semi-finished product is extruded from a plastic material.

7. The method as defined in claim 1, wherein the separation tool and the hollow section bar are arranged in a predefined firm spatial relation one to the other.

8. The method as defined in claim 7, wherein the separation tool is arranged so as to have a constant separation plane.

9. The method as defined in claim 7, wherein the hollow section bar is arranged in parallel to the separation plane of the separation tool.

10. The method as defined in claim 9, wherein the hollow section bar is arranged in parallel to the predefined section of the semi-finished product and that the gripper performs a translational movement only in a direction perpendicular to the separation plane and in a direction parallel to the separation plane.

11. The method as defined in claim 10, wherein the gripper also performs a swinging movement about an axis perpendicular to the separation plane.

12. The method as defined in claim 9, wherein the hollow section bar is arranged in parallel to the predefined section of the semi-finished product and that the gripper performs exclusively a translational movement for inserting the shaped piece.

13. The method as defined in claim 7, wherein the shaped piece is a straight connector and that the separation tool and one end of the hollow section bar are arranged in firm spatial relation one to the other.

14. The method as defined in claim 7, wherein the shaped piece is an angle piece intended for connecting two hollow section bars at an angle to form a corner and that the separation tool and one of the ends of at least one of the two hollow section bars are arranged in a firm spatial relation one to the other.

15. The method as defined in claim 7, wherein the shaped piece is a two-leg structure that can be folded from a straight condition to an angle piece by means of which two hollow section bars are connected one with the other at an angle to form a corner and that the separation tool and one of the ends of at least one of the two hollow section bars are arranged for that purpose in firm spatial relation one relative to the other.

16. The method as defined in claim 7, characterized by the steps of providing the hollow section bar at locations where a corner of the spacer is to be formed with a cutout that extends over the corner;

introducing a shaped piece, which is configured as a two-leg structure and which can be folded from a straight condition to an angle piece, through the cutout into the hollow section bar; and forming the corner of the spacer by bending or folding the hollow section bar together with the shaped piece contained in it.

17. The method as defined in claim 16, wherein the separation tool and the respective cutout of the hollow section bar are arranged in firm spatial relation one relative to the other.

18. The method as defined in claim 16, wherein the hollow section bar comprises an outer wall that forms the outside of the spacer;

an inner wall opposite the outer wall that forms the inside of the spacer;

and two flanks that connect the outer wall and the inner wall of the spacer one with the other;

and that on the one hand the cutout extends, at a location envisaged for forming the corner, from the inner wall opposite the outer wall (48) along the flanks towards the outer wall without cutting through the latter;

and on the other hand the cutout extends, on both sides of the location envisaged for forming the corner, on the inner wall, over a total length smaller than the length of the foldable shaped piece.

19. The method as defined in claim 1, wherein the semi-finished product is cut between cutting edges of the separation tool that can be moved in opposite directions.

20. The method as defined in claim 1, wherein the semi-finished product is cut, using a rotating cutting tool.

* * * * *